US010663665B2

(12) United States Patent
Blazer

(10) Patent No.: US 10,663,665 B2
(45) Date of Patent: May 26, 2020

(54) RIBBON HANDLING DEVICE FOR FUSION SPLICER AND METHODS OF FUSION SPLICING

(71) Applicant: CORNING RESEARCH & DEVELOPMENT CORPORATION, Corning, NY (US)

(72) Inventor: Bradley Jerome Blazer, Granite Falls, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/204,280

(22) Filed: Nov. 29, 2018

(65) Prior Publication Data

US 2019/0162904 A1  May 30, 2019

Related U.S. Application Data

(60) Provisional application No. 62/592,860, filed on Nov. 30, 2017.

(51) Int. Cl.
*G02B 6/44* (2006.01)
*G02B 6/255* (2006.01)

(52) U.S. Cl.
CPC ......... *G02B 6/2551* (2013.01); *G02B 6/4403* (2013.01)

(58) Field of Classification Search
CPC .................................................. G02B 6/2551
USPC .......................................................... 385/96
See application file for complete search history.

(56) References Cited

U.S. PATENT DOCUMENTS

| | | | | |
|---|---|---|---|---|
| 4,973,127 A | * | 11/1990 | Cannon, Jr. .......... | G02B 6/3839 156/158 |
| 5,155,787 A | * | 10/1992 | Carpenter ............ | G02B 6/3636 385/98 |
| 5,183,489 A | * | 2/1993 | Brehm ................. | C03B 23/037 385/98 |
| 5,191,632 A | * | 3/1993 | Mansfield ............ | G02B 6/3802 385/134 |
| 5,296,072 A | * | 3/1994 | Dannoux .............. | G02B 6/30 156/257 |
| 5,519,798 A | * | 5/1996 | Shahid ................. | G02B 6/3636 385/59 |
| 6,219,484 B1 | * | 4/2001 | Rhee .................... | G02B 6/3636 385/137 |
| 6,263,137 B1 | * | 7/2001 | Yoneyama ............ | G02B 6/421 385/49 |
| 6,352,372 B1 | * | 3/2002 | Shahid ................. | G02B 6/3879 385/136 |

(Continued)

OTHER PUBLICATIONS

Collier et al; "Ribbon Splicing Tools and Methods"; filed as U.S. Appl. No. 62/427,925 filed Nov. 30, 2016; 28 Pages.

*Primary Examiner* — Akm E Ullah
(74) *Attorney, Agent, or Firm* — William D. Doyle

(57) ABSTRACT

A ribbon handler device holds a twelve fiber ribbon during thermal stripping, cleaving and mass fusion splicing. The handler device includes a first body having a first array of grooves that are tapered to reduce a nominal spacing of a first set of optical fibers and a second body having a second array of grooves that are tapered to increase a nominal spacing of a second set of optical fibers such that each fiber of the first set of optical fibers aligns with a corresponding fiber of the second set of optical fibers for efficient splicing.

22 Claims, 2 Drawing Sheets

(56) References Cited

U.S. PATENT DOCUMENTS

| | | | | |
|---|---|---|---|---|
| 6,447,171 B1* | 9/2002 | Demangone | G02B 6/3869 | 385/59 |
| 6,728,450 B2* | 4/2004 | Tombling | G02B 6/3636 | 385/49 |
| 6,798,968 B2* | 9/2004 | Ten Eyck | G02B 6/3636 | 385/137 |
| 6,859,588 B2* | 2/2005 | Kim | G02B 6/30 | 385/49 |
| 7,103,256 B2* | 9/2006 | Song | G02B 6/3636 | 385/137 |
| 7,438,485 B2 | 10/2008 | Tabata et al. | | |
| 9,933,571 B2* | 4/2018 | Murgatroyd | G02B 6/25 | |
| 10,488,595 B2* | 11/2019 | Grehn | G02B 6/30 | |
| 2002/0031323 A1* | 3/2002 | Hattori | G02B 6/245 | 385/137 |
| 2005/0276550 A1* | 12/2005 | Kanda | G02B 6/2551 | 385/97 |
| 2017/0343751 A1 | 11/2017 | Bookbinder et al. | | |

* cited by examiner

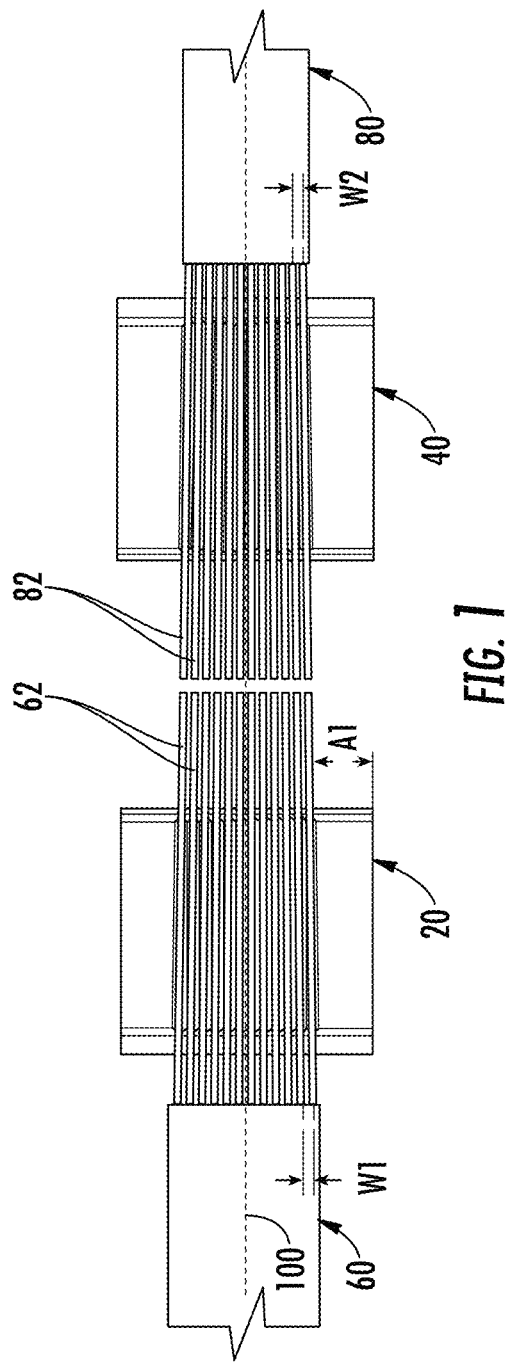
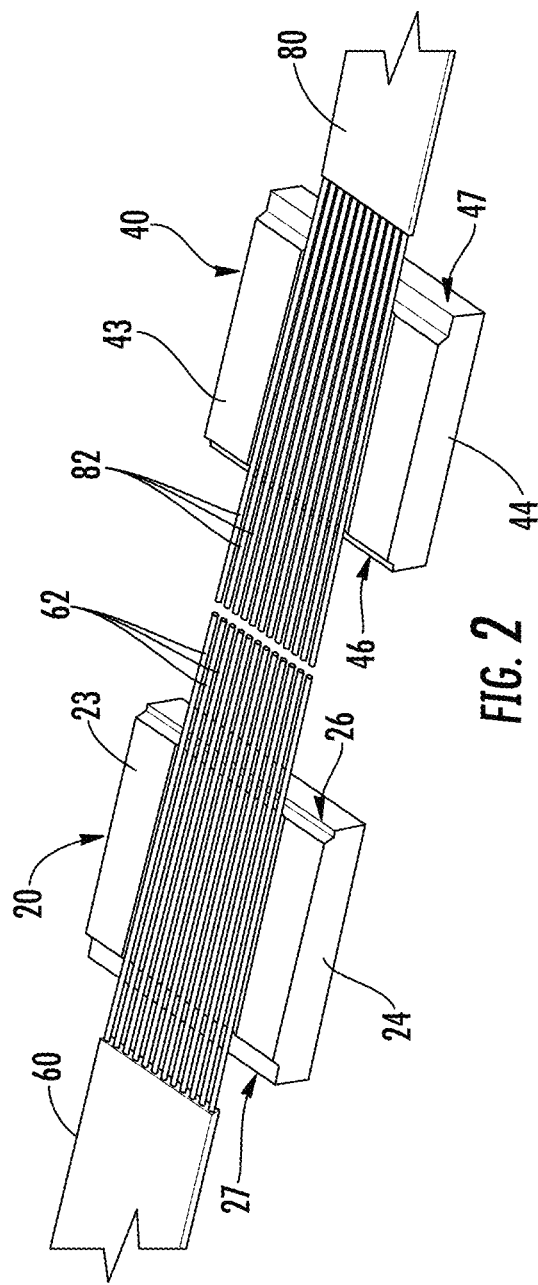

RIBBON HANDLING DEVICE FOR FUSION SPLICER AND METHODS OF FUSION SPLICING

PRIORITY APPLICATION

This application claims the benefit of U.S. Provisional Application No. 62/592,860, filed on Nov. 30, 2017, the content of which is relied upon and incorporated herein by reference in its entirety.

BACKGROUND

The disclosure relates generally to optical communication cables and more particularly to tools and methods for mass fusion splicing of the optical fibers in those cables. Demand is growing for higher fiber count cables and/or higher density of optical fibers in a single cable. As cable prices have decreased over the years, cable installation costs have continued to increase. Accordingly, there is a desire to put more fibers in the same space in order to reduce total installed costs. The trend is toward smaller diameter cables and/or the most fibers possible that can fit inside a given diameter duct space. One option for cable manufacturers to meet this demand is with ribbon cables having densely stacked ribbons of optical fibers or solutions that rely on rollable ribbon concepts, which incorporate, for example, intermittent webs lightly tacking the fibers together to create flexible ribbons that can be more easily rolled to conform to high density packing in a cable jacket or duct. Moreover, new optical fiber designs, in particular those having smaller outside diameters, such as 200 µm optical fibers, are available for use in these ribbon cables. Replacing the larger 250 µm fibers that have been used in conventional ribbon cables can allow even denser fiber counts in cables having the same or smaller size parameters as those conventional ribbon cables.

However, a key customer value for these cables remains the desire that the fibers can still be mass fusion spliced, for example in units of 12. In addition, the ability to mass fusion splice twelve 200 µm to twelve 250 µm fibers is required to enable successful integration of these new cables into existing network infrastructures.

SUMMARY

Field mass fusion splicing parameters are disclosed herein that provide acceptable fusion splicing of 200 µm spaced ribbons to conventional previously installed 250 µm spaced fibers. In accordance with yet other aspects of the present disclosure, ribbon splicing solutions include a ribbon handling device for holding up to a twelve fiber ribbon during thermal stripping, cleaving and mass fusion splicing, the handler device comprising a first body having a lower surface, an upper surface, and two side walls, wherein a first array of grooves are provided in the upper surface of the first body for receiving a first set of optical fibers; and a second body having a lower surface, an upper surface, and two side walls, wherein a second array of grooves are provided in the upper surface of the second body for receiving a second set of optical fibers. The second set of optical fibers has a nominal fiber size that is smaller than a nominal fiber size of the first set of optical fibers. The first array of grooves are tapered to reduce a nominal spacing of the first set of optical fibers and the second array of grooves are tapered to increase a nominal spacing of the second set of optical fibers such that each fiber of the first set of optical fibers aligns with a corresponding fiber of the second set of optical fibers for efficient splicing.

In accordance with aspects of the present disclosure, a ribbon handler device for holding a twelve fiber ribbon during thermal stripping, cleaving and mass fusion splicing, has a first body with a lower surface, an upper surface, and two side walls, wherein a first array of grooves are provided in the upper surface of the first body for receiving a first set of optical fibers. The ribbon handler device also includes a second body having a lower surface, an upper surface, and two side walls, wherein a second array of grooves are provided in the upper surface of the second body for receiving a second set of optical fibers. The second set of optical fibers has a nominal fiber size that is smaller than a nominal fiber size of the first set of optical fibers, and the first array of grooves are tapered to reduce a nominal spacing of the first set of optical fibers and the second array of grooves are tapered to increase a nominal spacing of the second set of optical fibers such that each fiber of the first set of optical fibers aligns with a corresponding fiber of the second set of optical fibers.

BRIEF DESCRIPTION OF THE DRAWINGS

FIG. 1 is a top view of optical fiber splicing assembly in a state of use, in accordance with aspects of the present disclosure;

FIG. 2 is a perspective view of the optical fiber splicing assembly of FIG. 1 in the same state of use, in accordance with aspects of the present disclosure;

DETAILED DESCRIPTION

Figure 3:
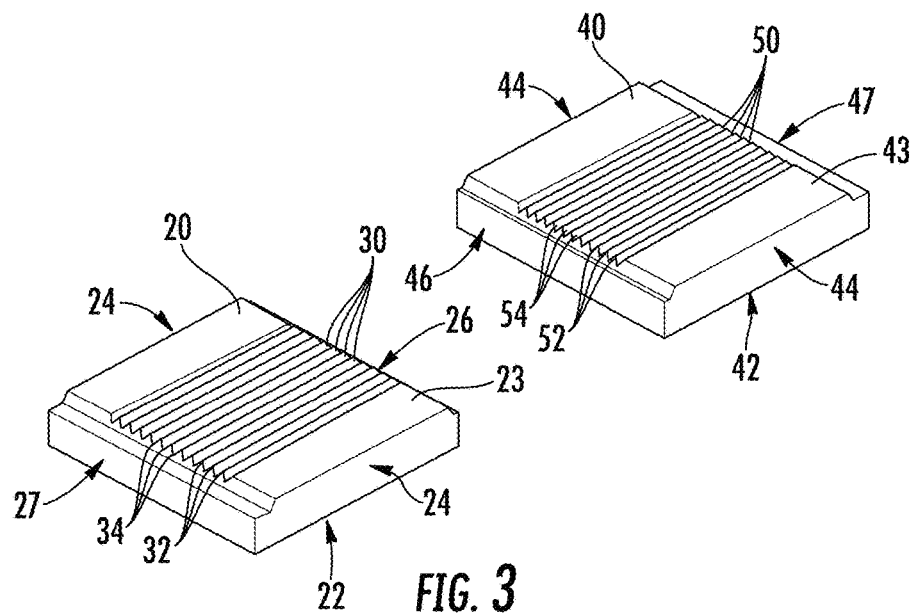
FIG. 3 is a perspective view of the handling device of an optical fiber splicing assembly, in accordance with aspects of the present disclosure.

Aspects of the present disclosure allow splicing of dissimilar ribbon (i.e., ribbons with differing fiber outside diameters) with no special preparation. As shown in FIGS. 1 through 3, a pair of 12f v-groove handling assemblies 20, 40 provide the capability to mass fusion splice a first optical fiber ribbon 60 comprising a first set of fibers 62 having a first nominal fiber spacing W1, which for example is approximately 0.25 mm between the centers of each of the plurality of fibers in the case of 250 µm fibers, to a second optical fiber ribbon 80 comprising a second set of fibers 82 with a second nominal fiber spacing W2, which for example is approximately 0.20 mm for 200 µm fibers. The nominal fiber spacing as described herein is measured on the outboard end of each v-groove assembly and corresponds to the fiber spacing within the ribbon being held by the individual handling assembly.

As shown more particularly in FIG. 3, the first handling assembly 20 of the optical fiber splicing assembly includes a first body having a lower surface 22 and an upper surface 23 separated by two side walls 24 extending in a longitudinal direction, an inboard end 26 and an outboard end 27. A first array of grooves 30 are provided in the upper surface 23 of the first body for receiving the first set of optical fibers 62. In accordance with aspects of the present invention, the array of grooves 30 may comprise a series of v-shaped grooves having a series of peaks 32 and valleys 34.

As also shown in FIG. 3, the second handling assembly 40 of the optical fiber splicing assembly includes a first body having a lower surface 42 and an upper surface 43 separated by two side walls 44 extending in a longitudinal direction, an inboard end 46 and an outboard end 47. A second array of grooves 50 are provided in the upper surface 43 of the first body for receiving the second set of optical fibers 82. In accordance with aspects of the present invention, the array of grooves 50 may comprise a series of v-shaped grooves having a series of peaks 52 and valleys 54.

The handling assembly 20,40 for each ribbon is typically mounted in a splicing machine to rest at a slight downward angle to bend the fibers slightly as they enter the v-groove arrays 30,50, using the bending stiffness of the individual fibers to lay them firmly in the grooves prior to closing a retaining lid. As a result, the fibers make first contact at the outboard ends 27, 47 of the v-groove arrays 30, 50.

Figure 4:
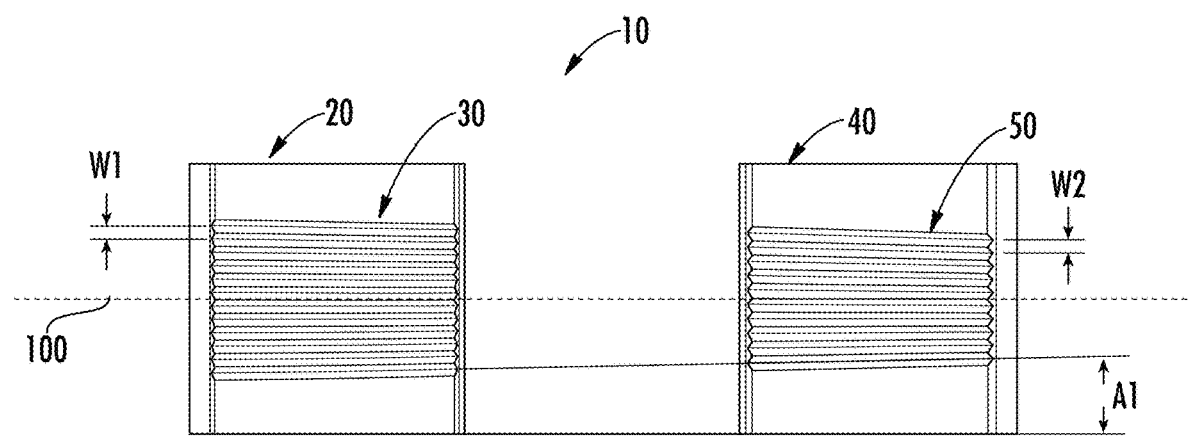
FIG. 4 is a top view of the handling device of an optical fiber handling device, in accordance with aspects of the present disclosure.

As shown in FIGS. 1 and 4, each groove of the first array of grooves 30 may be tapered from the outboard end 27 toward the inboard end 26. Each groove is tapered toward a longitudinal center line 100 with the outer most grooves being angled at an angle A1 to reduce the first nominal spacing W1 of the first set of optical fibers 62. Similarly, the second array of grooves 50 may be tapered from the outboard end 47 toward the inboard end 46. Each groove is tapered toward the longitudinal center line 100 with the outer most grooves being angled at an angle A1 to increase the second nominal spacing W2 of the second set of optical fibers 82. As such, each fiber of the first set of optical fibers 62 efficiently aligns with a corresponding fiber of the second set of optical fibers 82 for efficient splicing of two ribbons comprised of different sized fibers.

The result is a set of v-groove handling assemblies with a fan pattern that tapers from the wider spaced ribbon to the narrower spaced ribbon. As shown in FIGS. 1 and 2, the 0.25 mm spaced ribbon 60 with its stripped fibers 62 rests in v-grooves 30 which fan the fibers to a narrower spacing with the outer fibers tapering in at an angle A of approximately 1.1° in relation to the centerline 100. Opposing the fibers 62 are the fibers 82 from 0.20 mm spaced ribbon 80 resting in the second array of v-grooves 50 which fan those fibers to an increased spacing with the outer fibers tapering out at an angle A of approximately 1.1° in relation to the centerline 100. Each v-groove is co-linear with the opposing v-groove and all fibers are arranged in a plane to enable mass fusion splicing.

Most mass fusion splicers mount the v-groove assembly permanently and v-grooves cannot be changed by the end user. In accordance with aspects of the present disclosure, the v-groove assembly can easily be replaced by the end user in the splicing machine. This would allow the user to switch individual v-groove assemblies between 250-250, 200-200, 250-200, and 200-250 um fiber splicing.

A method of splicing a first optical fiber ribbon having a first nominal spacing to a second optical fiber ribbon having a second nominal spacing different from the first nominal spacing includes thermally stripping an end portion of the first optical fiber ribbon to expose a first set of optical fibers and thermally stripping an end portion of the second optical fiber ribbon to expose a second set of optical fibers. The first set of optical fibers may then be placed into the first body of the ribbon handler device and the second set of optical fibers placed into the second body of the ribbon handler device. As shown in FIGS. 1 to 3, the first body of the ribbon handler device comprises a first array of grooves defined in an upper surface of the first body for receiving the first set of optical fibers and the second body of the ribbon handler device comprises a second array of grooves defined in an upper surface of the second body for receiving the first set of optical fibers. The second set of optical fibers has a nominal fiber size that is smaller than a nominal fiber size of the first set of optical fibers. Accordingly, the first array of grooves are tapered to reduce a nominal spacing of the first set of optical fibers and the second array of grooves are tapered to increase a nominal spacing of the second set of optical fibers such that each exposed fiber of the first set of optical fibers aligns with a corresponding exposed fiber of the second set of optical fibers. Once the exposed fibers of the first set and the second set of fibers are secured in the ribbon handler device, the ribbon handler device may be placed into a splice machine for completion of the splicing.

To achieve attenuation performance, aspects of the present disclosure may include ribbons with high performing 200 μm fibers, such as fibers with improved microbend performance as disclosed in U.S. Patent Application Ser. No. 62/341,369, which is incorporated herein. In addition, although pictured as ribbons with solid matrices of material surrounding the individual fibers in each ribbons, ribbons with intermittent bonding may be used in the handling assemblies in accordance with aspects of the present disclosure.

FIG. 5 shows a

The present inventions have thus been described with reference to the exemplary embodiments, which embodiments are intended to be illustrative of inventive concepts rather than limiting. Persons of ordinary skill in the art will appreciate that variations and modifications of the foregoing embodiments may be made without departing from the scope of the appended claims.

What is claimed is:

1. A ribbon handler device for holding a twelve fiber ribbon during thermal stripping, cleaving and mass fusion splicing, the handler device comprising:
    a first body having a lower surface, an upper surface, and two side walls, wherein a first array of grooves are provided in the upper surface of the first body for receiving a first set of optical fibers, wherein the first array of grooves tapers from an outboard end to an inboard end; and
    a second body having a lower surface, an upper surface, and two side walls, wherein a second array of grooves are provided in the upper surface of the second body for receiving a second set of optical fibers,
    wherein the second set of optical fibers has a nominal fiber size that is smaller than a nominal fiber size of the first set of optical fibers, and wherein the first array of grooves are tapered to reduce a nominal spacing of the first set of optical fibers and the second array of grooves are tapered to increase a nominal spacing of the second set of optical fibers such that each fiber of the first set of optical fibers aligns with a corresponding fiber of the second set of optical fibers,
    wherein the first body and the second body are aligned along a centerline, and
    wherein each outside groove of the first array of grooves is tapered at an angle of approximately 1.1° to decrease the nominal spacing of the first set of optical fibers from the outboard end to the inboard end of the first body in relation to the centerline.

2. The ribbon handler device of claim 1, wherein the nominal fiber size of the second set of optical fibers is 200 μm.

3. The ribbon handler device of claim 2, wherein the nominal fiber size of the first set of optical fibers is 250 μm.

4. The ribbon handler device of claim 1, wherein a groove spacing at the outboard end of the first body matches the nominal spacing of the first set of optical fibers.

5. The ribbon handler device of claim 4, wherein the groove spacing at the outboard end is 0.25 millimeters.

6. The ribbon handler device of claim 1, wherein second body further comprises an inboard end and an outboard end, and wherein the second array of grooves taper from the outboard end to the inboard end.

7. The ribbon handler device of claim 6, wherein a second groove spacing at the outboard end of the second body matches the nominal spacing of the second set of optical fibers.

8. The ribbon handler device of claim 7, wherein the second groove spacing at the outboard end is 0.20 millimeters.

9. The ribbon handler device of claim 1, wherein each outside groove of the second array of grooves is tapered at an angle of approximately 1.1° to increase the nominal spacing of the second set of optical fibers from the outboard end to the inboard end of the second body in relation to the centerline.

10. The ribbon handler device of claim 1, wherein the nominal fiber size of the first set of optical fibers is 250 µm.

11. The ribbon handler device of claim 10, wherein the nominal fiber size of the second set of optical fibers is 200 µm.

12. A method of splicing a first optical fiber ribbon having a first nominal spacing to a second optical fiber ribbon having a second nominal spacing different from the first nominal spacing, the method comprising:
    thermally stripping an end portion of the first optical fiber ribbon to expose a first set of optical fibers;
    thermally stripping an end portion of the second optical fiber ribbon to expose a second set of optical fibers;
    placing the first set of optical fibers into a first body of a ribbon handler device, wherein the first body of the ribbon handler device comprises a first array of grooves defined in an upper surface of the first body for receiving the first set of optical fibers;
    placing the second set of optical fibers into a second body of the ribbon handler device, wherein the second body of the ribbon handler device comprises a second array of grooves defined in an upper surface of the second body for receiving the first set of optical fibers, wherein the second set of optical fibers has a nominal fiber size that is smaller than a nominal fiber size of the first set of optical fibers, and wherein the first array of grooves are tapered to reduce a nominal spacing of the first set of optical fibers and the second array of grooves are tapered to increase a nominal spacing of the second set of optical fibers such that each exposed fiber of the first set of optical fibers aligns with a corresponding exposed fiber of the second set of optical fibers; and
    placing the ribbon handler device into a splice machine for completing the splicing.

13. The method of claim 12, wherein the nominal fiber size of the second set of optical fibers is 200 µm.

14. The method of claim 13, wherein the nominal fiber size of the first set of optical fibers is 250 µm.

15. The method of claim 12, wherein first body further comprises an inboard end and an outboard end, and wherein the first array of grooves taper from the outboard end to the inboard end.

16. The method of claim 13, wherein a groove spacing at the outboard end of the first body matches the nominal spacing of the first set of optical fibers.

17. The method of claim 16, wherein the groove spacing at the outboard end is 0.25 millimeters.

18. The method of claim 12, wherein second body further comprises an inboard end and an outboard end, and wherein the second array of grooves taper from the outboard end to the inboard end.

19. The method of claim 18, wherein a second groove spacing at the outboard end of the second body matches the nominal spacing of the second set of optical fibers.

20. The method of claim 19, wherein the second groove spacing at the outboard end is 0.20 millimeters.

21. The method of claim 15, further comprising a centerline on which the first body and the second body are aligned, wherein each outside groove of the first array of grooves is tapered at an angle of approximately 1.1° to decrease the nominal spacing of the first set of optical fibers from the outboard end to the inboard end of the first body in relation to the centerline.

22. The method of claim 18, wherein each outside groove of the second array of grooves is tapered at an angle of approximately 1.1° to increase the nominal spacing of the second set of optical fibers from the outboard end to the inboard end of the second body in relation to the centerline.

* * * * *